United States Patent
Gupta et al.

(10) Patent No.: US 11,748,495 B2
(45) Date of Patent: Sep. 5, 2023

(54) SYSTEMS AND METHODS FOR DATA USAGE MONITORING IN MULTI-TENANCY ENABLED HADOOP CLUSTERS

(71) Applicant: JPMORGAN CHASE BANK, N.A., New York, NY (US)

(72) Inventors: Akhilesh Gupta, West Chester, PA (US); Ratikanta Mishra, Bear, DE (US); Suman Kumar Addanki, Chadds Ford, PA (US); Ramnath Mahale, West Chester, PA (US); Michael Aguiling, Tappan, NY (US); Phaneendra Vijay Mukkamala, Glen Mills, PA (US); Jay Rajaram, North Brunswick, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 683 days.

(21) Appl. No.: 16/697,817

(22) Filed: Nov. 27, 2019

(65) Prior Publication Data

US 2020/0167485 A1 May 28, 2020

Related U.S. Application Data

(60) Provisional application No. 62/772,431, filed on Nov. 28, 2018.

(51) Int. Cl.
*G06F 17/30* (2006.01)
*G06F 21/60* (2013.01)
(Continued)

(52) U.S. Cl.
CPC ........ *G06F 21/604* (2013.01); *G06F 16/2322* (2019.01); *G06F 16/24573* (2019.01);
(Continued)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 10,922,284 B1 * 2/2021 Venkatasubramanian ...................
H04L 61/4523
2013/0254196 A1 * 9/2013 Babu ..................... G06F 9/5066
707/736

(Continued)

FOREIGN PATENT DOCUMENTS

EP 2778967 9/2014

OTHER PUBLICATIONS

International Search Report and Written Opinion of the International Searching Authority, dated Jan. 18, 2020, from corresponding International Application No. PCT/US2019/063596.

(Continued)

*Primary Examiner* — Hung D Le
(74) *Attorney, Agent, or Firm* — GREENBERG TRAURIG LLP

(57) ABSTRACT

Systems and methods for data usage monitoring in multi-tenancy enabled HADOOP clusters are disclosed. According to one embodiment, a method for monitoring data usage in multi-tenancy enabled HADOOP clusters may include: (1) receiving metadata related to a dataset in one or more multi-tenant clusters; (2) receiving entitlement data for a plurality of users to the dataset; (3) receiving group membership data for the plurality of users; (4) receiving access permissions for the plurality of users to the dataset; (5) receiving audit logs comprising access history for the plurality of users to the dataset; (6) joining the metadata, entitlement data, group membership data, access permissions, and audit logs into a searchable database; (7) receiving a query comprising at least one of a date range, a file, a (Continued)

directory, a user, and a group of users; (8) applying the query to the searchable database; and (9) returning results to the query.

18 Claims, 9 Drawing Sheets

(51) Int. Cl.
    *G06F 16/2457*     (2019.01)
    *G06F 16/23*     (2019.01)
    *G06F 16/28*     (2019.01)
    *G06F 16/25*     (2019.01)
    *G06F 21/62*     (2013.01)

(52) U.S. Cl.
    CPC .......... *G06F 16/252* (2019.01); *G06F 16/283* (2019.01); *G06F 21/6227* (2013.01)

(56) References Cited

U.S. PATENT DOCUMENTS

| | | | |
|---|---|---|---|
| 2014/0082749 | A1 | 3/2014 | Holland et al. |
| 2014/0164452 | A1* | 6/2014 | Ying ................ G06F 16/182 |
| | | | 707/827 |
| 2015/0066646 | A1* | 3/2015 | Sriharsha .......... G06Q 30/0256 |
| | | | 705/14.54 |
| 2015/0120695 | A1* | 4/2015 | Vasu ................ G06F 16/2228 |
| | | | 707/711 |
| 2016/0350146 | A1* | 12/2016 | Udupi ................ H04L 45/127 |
| 2017/0026361 | A1* | 1/2017 | Jayakumar .......... H04L 63/0807 |
| 2017/0339156 | A1* | 11/2017 | Gupta ................ H04L 63/083 |

OTHER PUBLICATIONS

Anonymous; "Row Store and Column Store Databases—Percona Database Performance Blog"; Dec. 14, 2016.

* cited by examiner

SYSTEMS AND METHODS FOR DATA USAGE MONITORING IN MULTI-TENANCY ENABLED HADOOP CLUSTERS

RELATED APPLICATIONS

This application claims the benefit of U.S. Provisional Patent Application Ser. No. 62/772,431, filed Nov. 28, 2018, the disclosure of which is hereby incorporated by reference, in its entirety.

BACKGROUND OF THE INVENTION

1. Field of the Invention

The present invention generally relates to systems and methods for data usage monitoring in multi-tenancy enabled HADOOP clusters.

2. Description of the Related Art

In a HADOOP multi-cluster environment with thousands of nodes that may be handling sensitive data, data monitoring is important. For example, it is important to be aware of who has access to what kind of data in which systems, who accessed the data, and when the data was accessed in order to secure data and control any data breaches.

SUMMARY OF THE INVENTION

Systems and methods for data usage monitoring in multi-tenancy enabled HADOOP clusters are disclosed. According to one embodiment, in an information processing apparatus comprising at least one computer processor, a method for monitoring data usage in multi-tenancy enabled HADOOP clusters may include: (1) receiving metadata related to a dataset in one or more multi-tenant clusters; (2) receiving entitlement data for a plurality of users to the dataset; (3) receiving group membership data for the plurality of users; (4) receiving access permissions for the plurality of users to the dataset; (5) receiving audit logs comprising access history for the plurality of users to the dataset; (6) joining the metadata, entitlement data, group membership data, access permissions, and audit logs into a searchable database; (7) receiving a query comprising at least one of a date range, a file, a directory, a user, and a group of users; (8) applying the query to the searchable database; and (9) returning results to the query.

In one embodiment, the dataset may include files, directories, tables, databases, logical constructs, etc.

In one embodiment, the metadata may include classification metadata and properties metadata.

In one embodiment, the group membership may include an identification of the plurality of users that are in groups.

In one embodiment, at least of the metadata, the entitlement data, the group membership data, the access permissions, and the audit logs may be received in real-time or substantially in real-time, periodically, etc.

In one embodiment, the access permissions may be received from access control lists.

In one embodiment, the access permissions may be further received from file and directory permissions.

In one embodiment, the joined data may be partitioned based on a unit of time.

In one embodiment, the method may further include storing the joined data in an optimal format for querying.

According to another embodiment, a system for monitoring data usage in multi-tenancy enabled HADOOP clusters may include a data mart comprising at least one computer processor; one or more multi-tenant clusters storing a dataset; a metadata source storing metadata related to the dataset; an entitlement data source storing entitlement data for a plurality of users; a group membership source storing group membership data for the plurality of users; an access permissions source storing access permissions for the plurality of users to the dataset; and an audit log source storing access history for the plurality of users to the dataset. The data mart may receive the metadata, the entitlement data, the group membership data, the access permissions, and the audit logs; join the metadata, entitlement data, group membership data, access permissions, and audit logs into a searchable database; receive a query comprising at least one of a date range, a file, a directory, a user, and a group of users; apply the query to the searchable database; and return results to the query.

In one embodiment, the dataset may include files, directories, tables, databases, logical constructs, etc.

In one embodiment, the metadata may include classification metadata and properties metadata.

In one embodiment, the group membership may include an identification of the plurality of users that are in groups.

In one embodiment, at least of the metadata, the entitlement data, the group membership data, the access permissions, and the audit logs may be received in real-time or substantially in real-time, periodically, etc.

In one embodiment, the access permissions may be received from access control lists.

In one embodiment, the access permissions may be further received from file and directory permissions.

In one embodiment, the joined data may be partitioned based on a unit of time.

In one embodiment, the joined data may be stored in an optimal format for querying.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The disclosures of each of U.S. patent application Ser. No. 15/602,339 and U.S. Provisional Patent Application Ser. No. 62/340,284 are hereby incorporated by reference in its entirety.

To monitor and analyze user activities, and specific key activities (e.g., Select, Update, Delete, Truncate or equivalent commands in case of HADOOP related services), HADOOP requires a complex strategy to identify user information. This becomes even more complicated when performing activities with Switch User (Impersonation), service user and regular user.

Embodiments may provide some or all of the following: (1) operationalize continuous data security audit to monitor the data usage across multi-tenant applications and achieve regulatory compliance in a HADOOP multi-cluster environment; (2) provide a data security audit with a high level of granularity (e.g., for users, groups, roles, servers, privileges, datasets/files, etc.), including exception management (PII data access, Login failures and access failures) in multi-tenant applications using a HADOOP framework; (3) protect unauthorized data access in each HADOOP cluster using a metadata layer with sensitive PII that is matched with user accesses of multiple components in HADOOP framework; and (4) provide a scalable solution that accommodates HADOOP applications where the volume of data keeps on growing in a HADOOP multi-cluster environment.

Embodiments may provide a record of what users had access to what data, including for users that may be part of a group that has been granted access.

Figure 1:
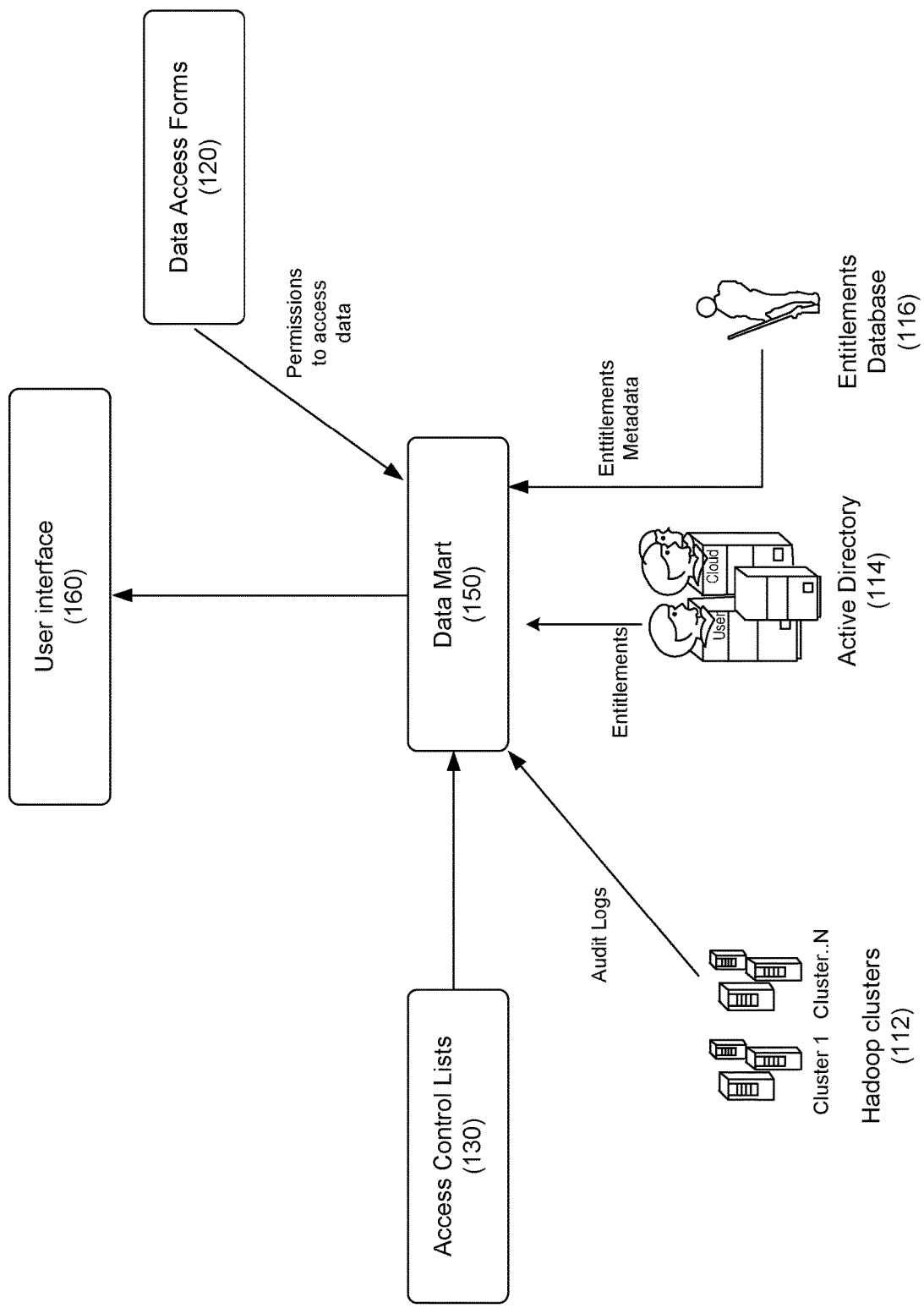
FIG. 1 depicts an architectural diagram of a system for data usage monitoring in multi-tenancy enabled HADOOP clusters according to one embodiment.

Referring to FIG. 1, a system for access monitoring of multi-tenant applications in HADOOP multi-cluster environment is disclosed according to one embodiment. System 100 may include HADOOP clusters 112, which may be multiple multi-tenant HADOOP clusters. HADOOP clusters 112 may provide audit logs, active directory files, etc. that may provide entitlement data for a logical grouping of users, and may store a mapping of users to groups. Entitlements database 116 that may provide may provide metadata including entitlement individual data for databases, such as HADOOP clusters 112.

In one embodiment, entitlements database may be a SENTRY database.

Data access forms 120 may store metadata with classification and properties around the dataset.

Entitlements database 116 may maintain and manage permissions to tables, files, the contents of the files, and logical constructs. In one embodiment, entitlements database 116 may provide metadata including entitlement individual data for databases, such as HADOOP clusters 112.

Active directory 114 may store entitlement data for groups of individuals. For example, permissions may be granted to a logical group, and active directory 114 may store a mapping between the users and the groups.

Access control lists 130 may manage permissions on files when access to the files cannot be managed using a local construct. For example, access control lists 130 may pull information from a HDFS file system (not shown).

Audit data logs, such as who accessed which files, the time of access, etc. may be received from HADOOP clusters 112.

In one embodiment, HADOOP clusters 112 may be multiple multi-tenant clusters.

Data from HADOOP clusters 112 may be received by data mart 150 along with entitlement data from, for example, entitlements database 116 and active directory data 114. In one embodiment, data mart 150 may be a HIVE data mart.

User interface 160 may be provided for user to query and run reports with regard to who has access to which objects in data mart 150.

Figure 2:
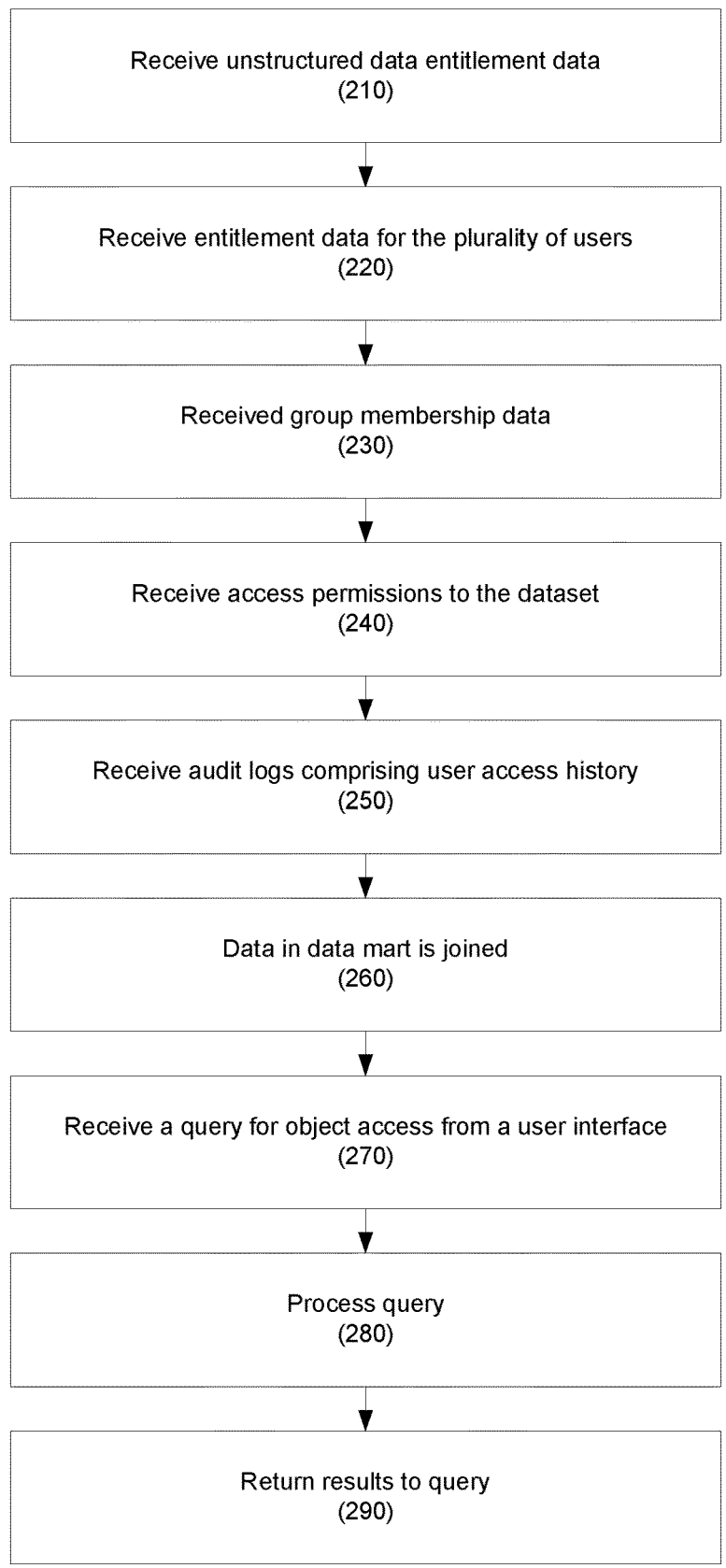
FIG. 2 depicts a method for data usage monitoring in multi-tenancy enabled HADOOP clusters according to one embodiment.

Referring to FIG. 2, a method for access monitoring of multi-tenant applications in HADOOP multi-cluster environment is disclosed according to one embodiment. In step 210, metadata about the dataset, such as classifications, properties, etc. may be received, for example, by a data mart.

In one embodiment, the dataset may be stored in one or more multi-tenant clusters, such as HADOOP clusters.

In step 220, the data mart may receive entitlement data for a plurality of users from an entitlements database. For example, the entitlement data may be received from a SENTRY database.

In step 230, the data mart may receive group membership data, which may identify a plurality of groups, and the users that are members of those groups.

In step 240, the data mart may receive access permissions for users to the dataset, such as to a plurality of files in the dataset. In one embodiment, the access permissions may be received from access control lists and the file/directory permissions.

In step 250, the data mart may receive user access history to files, directories, tables, databases, etc. in the dataset. In one embodiment, the user access history may be received from one or more multi-tenant Hadooop cluster.

In one embodiment, some or all of the data in steps 210-250 may be received by the data mart in real-time, or substantially in real-time. In one embodiment, some or all of the data in steps 210-250 may be received by the data mart in batches at certain times of the day (e.g., hourly, every 12 hours, once a day, etc.). Any suitable manner of receiving the data may be used as is necessary and/or desired.

In step 260, the data in the data may be joined and stored in a searchable format. In one embodiment, the data may be partitioned, for example, by hour, day, week, month, etc. For example, the data may be partitioned daily. In one embodiment, the data may be stored in an optimal format for querying (e.g., columnar formats such as ORC, Parquet, etc.).

In step 270, a query may be received from a user, from system, etc. In one embodiment, the query may identify, for example, a date range, a file, a directory, a user, a group of users, etc.

In one embodiment, anomalies may be identified and reported. For example, accesses to data at unusual hours, from unusual devices, by unexpected users, etc. may be identified and notification may be provided. This may be done upon each occurrence, when a threshold of occurrences is reached, or as otherwise necessary and/or desired.

In one embodiment, the query may be a report that may be run to identify access to files, directories, etc.

In step 280, the query may be applied to the data, and in step 290, the results may be returned. For example, if the query is for all users that accessed a data file during a certain period, the query may be applied to the dataset, and the results returned to the user.

Figure 3:
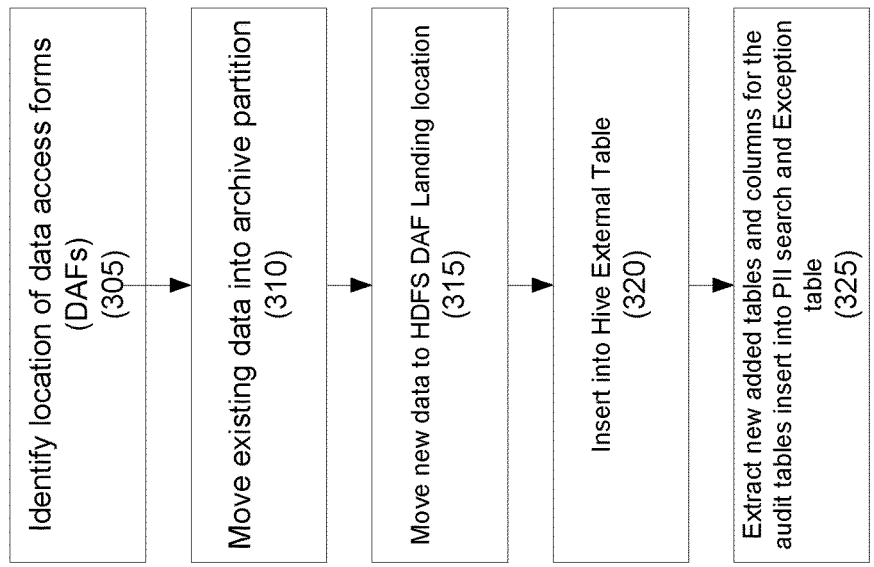
FIG. 3 depicts a data access form loading process according to one embodiment.

Referring to FIG. 3, a method for ingesting data from data access forms is disclosed according to one embodiment. In one embodiment, Java code may be used to fetch the data from, for example, data sources such as excel workbook and parse the data. It may be run periodically (e.g., once a day, once a week, bi-weekly, monthly, etc.), on demand, or as otherwise necessary and/or desired.

In step 305, locations of data access forms (DAFs) may be provided. In one embodiment, the location may be a SharePoint location. Any other suitable location may be provided as is necessary and/or desired.

In one embodiment, the data in the data access forms may be stored in an off-line format.

A shell script for DAF processing may be executed. In one embodiment, the script may be written in Java, and may perform the following: (310) move existing data into an archive partition; (315) move new data into a DAF landing location; and (320) insert the new data into a HIVE external table.

Next, in step 325, newly added tables and columns may be extracted.

Figure 4:
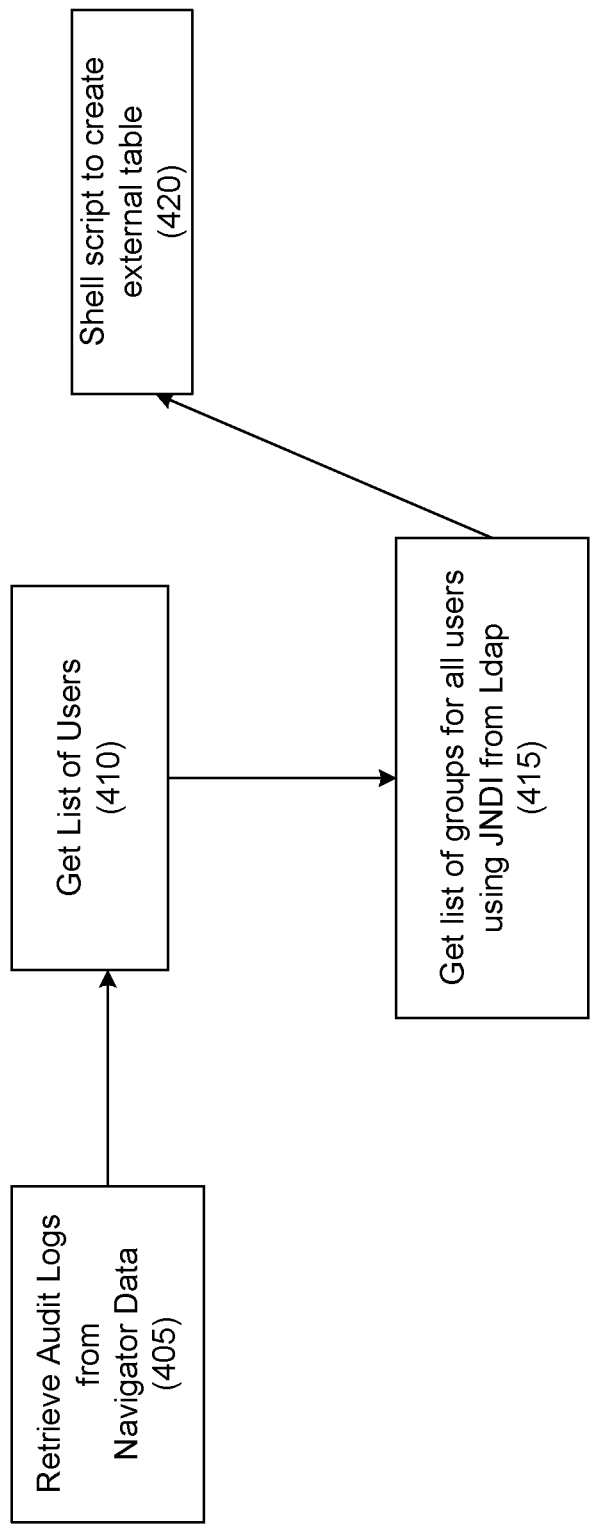
FIG. 4 depicts a method for processing CLOUDERA NAVIGATOR audit logs with user group retrieval according to one embodiment.

Referring to FIG. 4, a method for processing CLOUDERA NAVIGATOR audit logs with user group retrievals is disclosed according to one embodiment. This method may be run periodically (e.g., once a day, once a week, bi-weekly, monthly, etc.), on demand, or as otherwise necessary and/or desired.

In step 405, audit logs may be retrieved. In one embodiment, the audit logs from one or more database for each cluster may be retrieved from, for example, CLOUDERA NAVIGATOR.

In step 410, a list of users from CLOUDERA NAVIGATOR may be retrieved.

In step 415, a list of groups for all users using JNDI may be received from LDAP. For example, each user may belong to an active directory group.

In step 420, a shell script may be executed to create an external table of the group names of LDAP servers.

Figure 5:
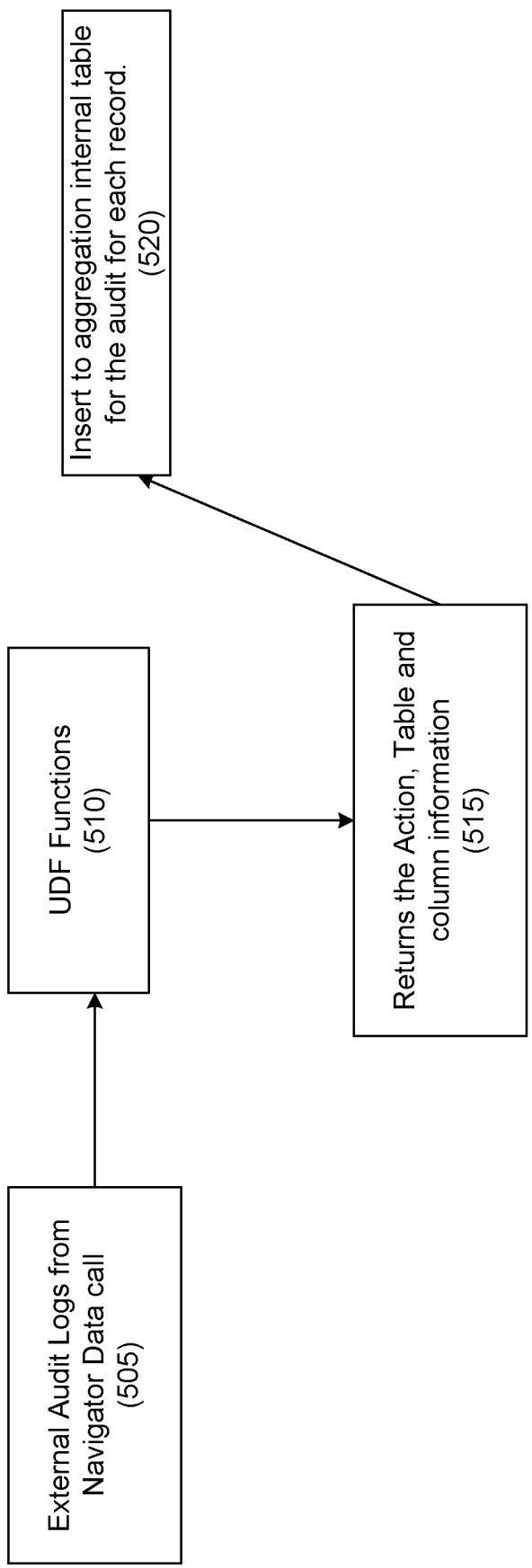
FIG. 5 depicts a process for extracting table and column information from an audit log according to one embodiment.

Referring to FIG. 5, a method for extracting table names and columns from audit records is disclosed according to one embodiment. This method may be run periodically (e.g., once a day, once a week, bi-weekly, monthly, etc.), on demand, or as otherwise necessary and/or desired.

In step 505, external audit logs may be retrieved from Navigator and/or GreenPlum using, for example, a data call.

In step 510, user-defined functions (UDF) may be performed

In step 515, action, table, and column information may be returned.

In step 520, the action, table, and column information may be inserted into an aggregation internal table for the audit for each record.

Figure 6:
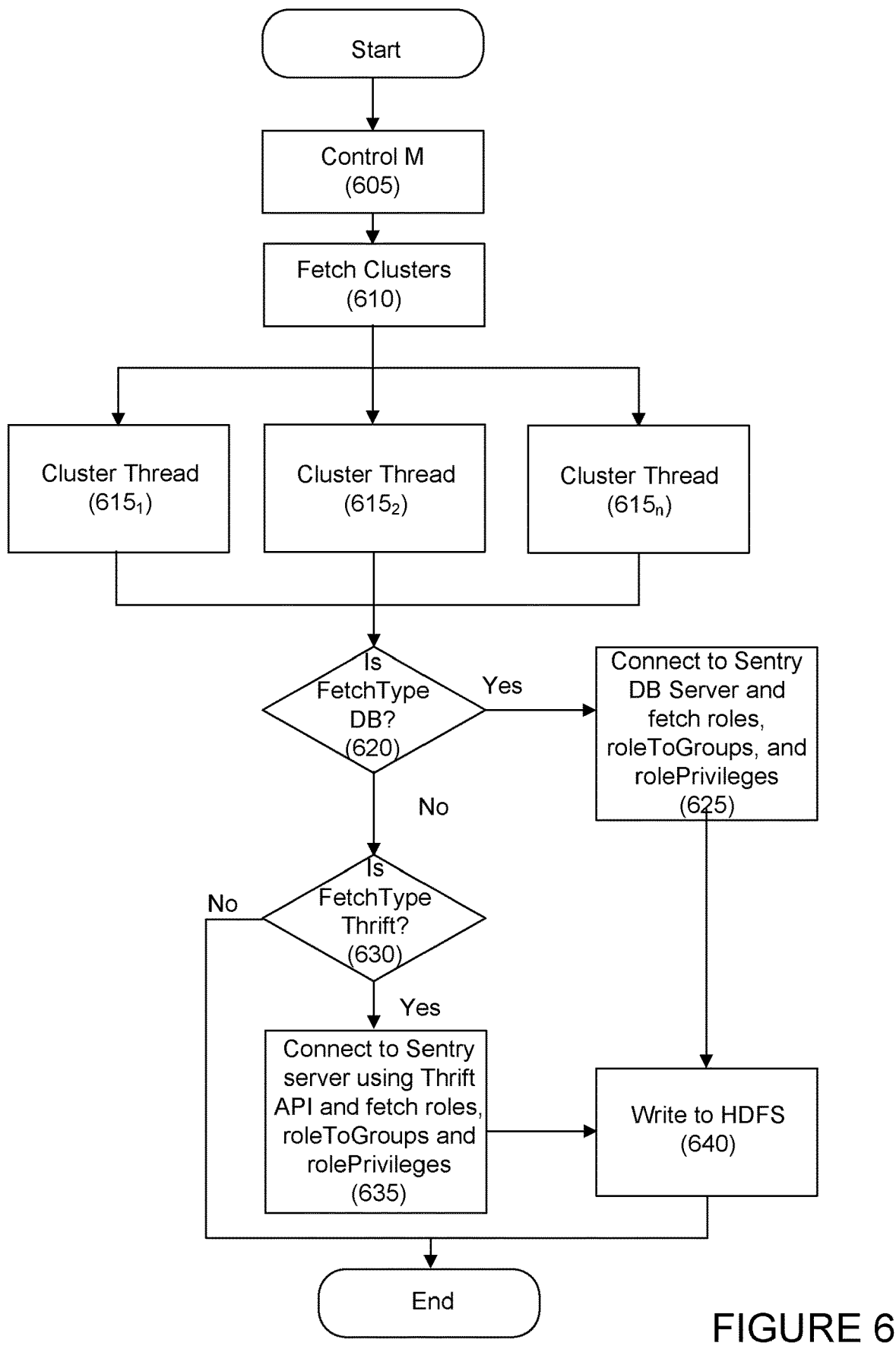
FIG. 6 depicts a SENTRY metadata extraction process according to one embodiment.

Referring to FIG. 6, a method for fetching SENTRY details from each HADOOP cluster is disclosed according to one embodiment.

In step 605, a workflow automation job (e.g., a Control-M job), which may be configured to run periodically (e.g., every 24 hours), may invoke a shell script as a HDFS user.

In step 610, data from the clusters may be fetched using one or more cluster threads $615_1$, $615_2$, ... $615_n$.

In step 620, if fetchtype is "DB" (i.e., the database where SENTRY entitlements are maintained) then in step 625, the method connects to SENTRY to fetch roles, roles to group mappings, role privileges, etc. In one embodiment, an API may be used.

If the fetchtype is not DB, in step 635, then a check is made to see is fetchtype is THRIFT (i.e., the thrift protocol). SENTRY exposes the entitlements using the thrift API, which may be consumed using the thrift protocol. If it is, in step 640, the method connects to SENTRY to fetch roles, roles to group mappings, role privileges, etc. In one embodiment, an API may be used.

In step 640, the roles, roles to group mappings, role privileges, etc. may be written to HDFS.

Figure 7:
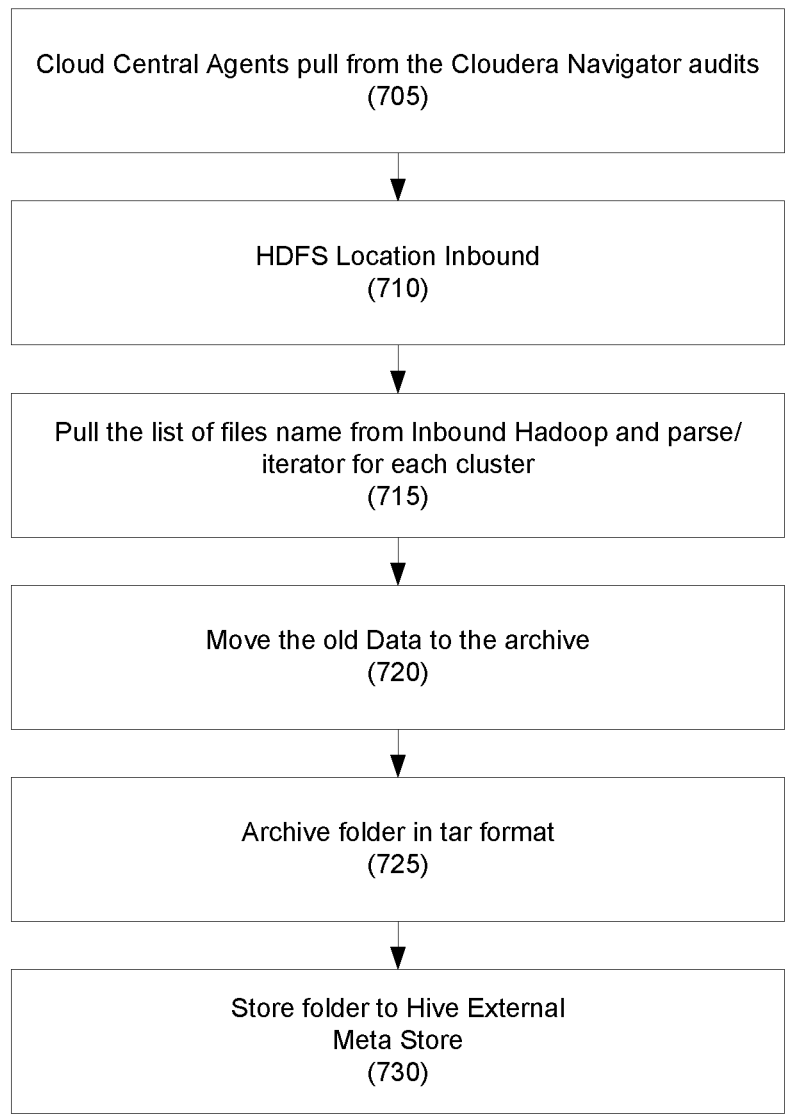
FIG. 7 depicts a method of SENTRY metadata staging to transformation according to one embodiment.

Referring to FIG. 7, a method for staging SENTRY metadata for transformation for the data marts is disclosed according to one embodiment.

In step 705, cloud central agents may retrieve data from CLOUDERA NAVIGATOR audits.

In step 710, HDFS location inbound may be received. This may include, for example, the HDFS location of the audit data that has been retrieved from Coudera Navigator.

In step 715, the lists of file names from the inbound HADOOP may be pulled and parsed. For example, all the files (i.e., audit data) in the HDFS location may be provided to another node on the cluster and parsed for further processing.

In step 720, old data may be moved to archive. In one embodiment, once a file is processed, it may be moved to an archive folder, where folders for a certain amount of time (e.g., 7 days) may be maintained. Data older than the specified age may be purged.

In step 725, the archive folder may be archived in, for example, tar format.

In step 730, the folder may be stored to, for example, a HIVE external table.

Figure 8:
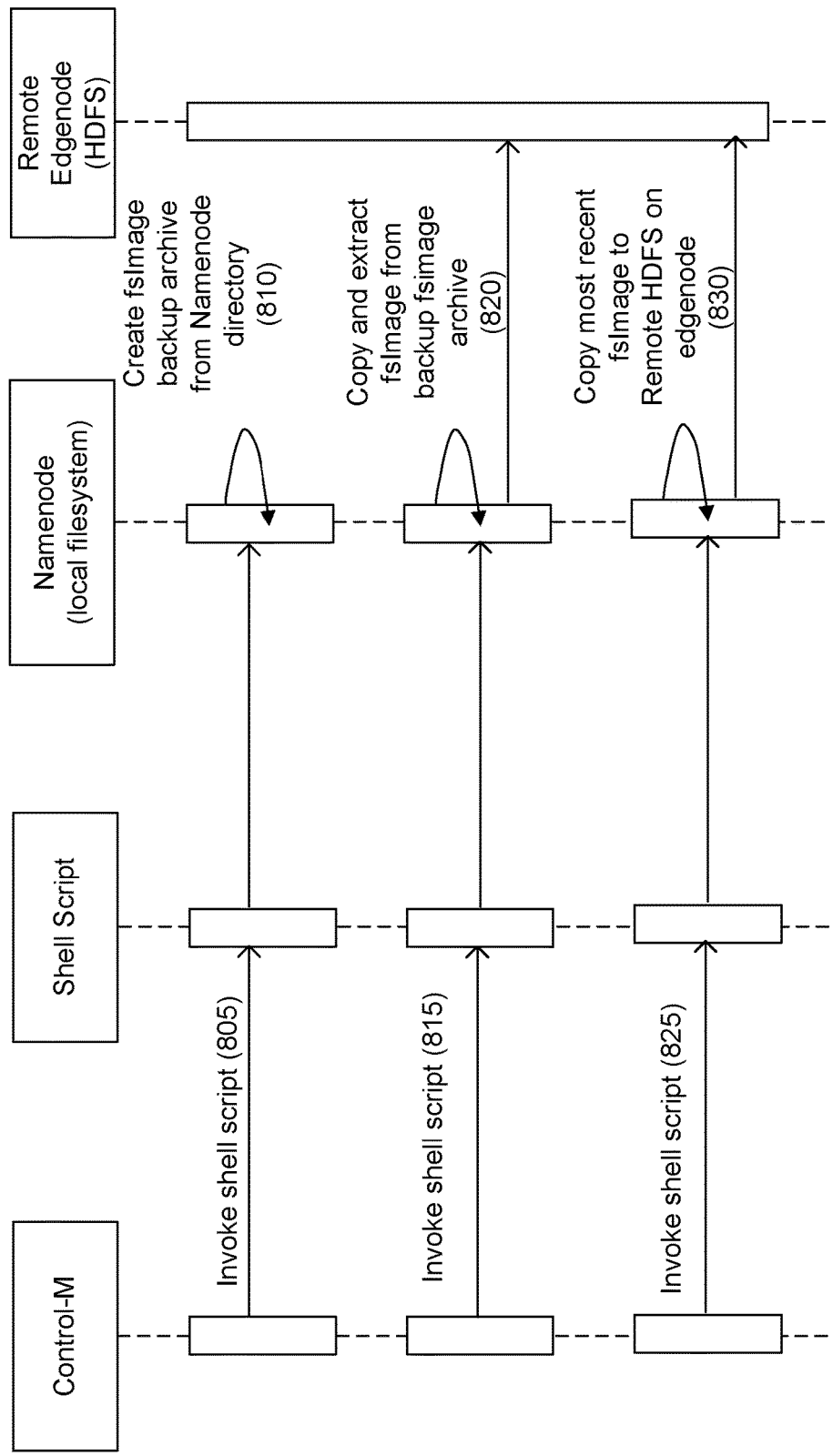
FIG. 8 depicts a process for pushing fsImage from each namenode using a control-in job to an edge node according to one embodiment.

Referring to FIG. 8, a process for pushing fsImage from each namenode using a workflow automation job (e.g., a Control-M job) to an edge node is disclosed according to one embodiment.

In step 805, a first workflow automation job (e.g., a Control-M job), which may be configured to run periodically (e.g., every 24 hours), may invoke a shell script as a HDFS user.

In step 810, the shell script may create an fsImage backup archive of the namenode directory in the local file system on the namenode.

In step 815, a second workflow automation job (e.g., a second Control-M job), which may be dependent on the first workflow automation job, may invoke a shell script as a_bdam_ingest_n (d/u/c) user depending on the environment. This script may copy the latest backup and may extract all files from the archive into a local directory on the namenode in step 820.

In step 825, a third workflow automation job (e.g., a third Control-M job), which may be dependent on the second workflow automation job, may invoke a shell script as a_bdam_ingest_n (d/u/c) user depending on the environment. This script may copy the most recent fsImage to the edgenode for processing in step 830.

In step 830, the shell script may copy the extracted fsImage and its corresponding message-digest algorithm (e.g., MD5) to the remote HDFS on the edgenode.

In one embodiment, the process may be repeated for each cluster within scope.

Figure 9:
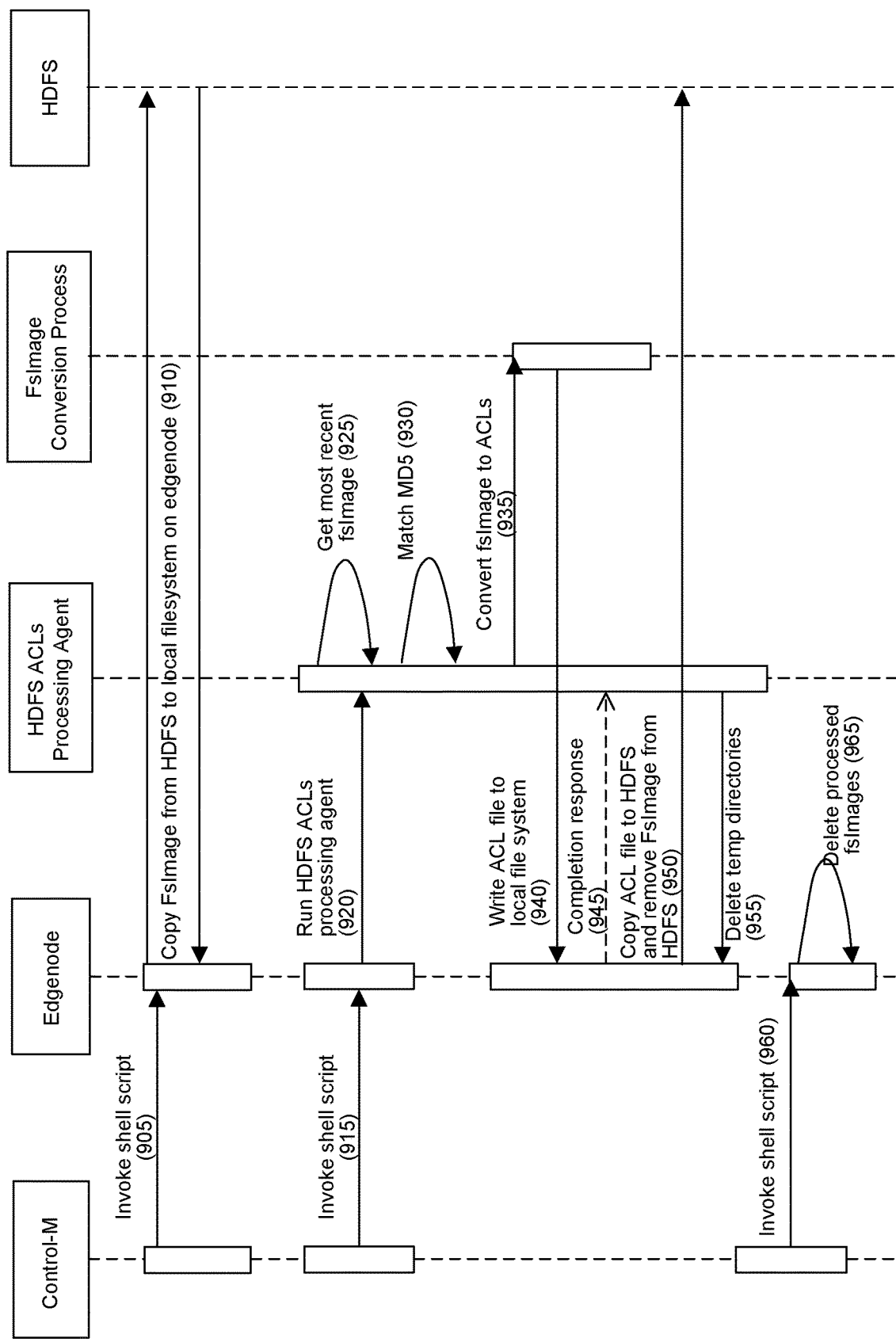
FIG. 9 depicts a process for deserializing a fsImage according to one embodiment.

Referring to FIG. 9, a process for deserializing a fsImage is disclosed according to one embodiment.

In step 905, first workflow automation job (e.g., a Control-M job), which may be configured to run periodically (e.g., every 24 hours), may invoke a shell script as a HDFS user.

In step 910, the shell script may copy fsImage and the corresponding MD5 from HDFS to the local file system on the edgenode.

In step 915, a second workflow automation job (e.g., a second Control-M job), which may be dependent on the first workflow automation job, may invoke a shell script to process the fsImage.

In step 920, the shell script may call the HDFS ACL processing agent.

In step 925, the HDFS ACL processing agent may pick the most recent fsImage for that cluster from the local directory.

In step 930, the HDFS ACL processing agent may verify that the fsImage's MD5 file content matches the generated MD5 for fsImage.

In step 935, the HDFS ACL processing agent may invoke the FsImage conversion process to convert the fsImage file to a text file with ACLs.

In step 940, the processed ACL file may be written to the local file system.

In step 945, the edgenode provides a completion response.

In step 950, the processed ACL file in the local file system may be copied to a temporary directory in HDFS, and the moved to a data directory in HDFS.

In step 955, the temporary files on the local file system may be deleted.

In step 960, a third workflow automation job (e.g., a third Control-M job), may invoke a shell script.

In step 965, the shell script may clean or remove all the processed files from the local directory.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the ANDROID operating system, the MICROSOFT WINDOWS™ operating systems, the UNIX operating system, the LINUX operating system, the XENIX operating system, the IBM AIX™ operating system, the Hewlett-Packard UX™ operating system, the Novell NETWARE™ operating system, the Sun Microsystems SOLARIS™ operating system, the OS/2™ operating system, the BeOS™ operating system, the MACINTOSH operating system, the APACHE operating system, an Openstep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for monitoring data usage in multi- tenancy enabled HADOOP clusters, comprising:
   in an information processing apparatus comprising at least one computer processor:
      receiving metadata related to a dataset in one or more multi-tenant enabled HADOOP clusters;
      receiving batches of entitlement data for a plurality of users to the dataset;
      receiving batches of group membership data for the plurality of users;
      receiving batches of access permissions for the plurality of users to the dataset;

receiving batches of audit logs comprising access history for the plurality of users to the dataset;

joining the batches of metadata, entitlement data, group membership data, access permissions, and audit logs into a searchable database;

partitioning the searchable database based on a unit of time;

receiving a query comprising at least one of a date range, a file, a directory, a user, and a group of users;

applying the query to the searchable database; and returning results to the query.

2. The method of claim 1, wherein the dataset comprises at least one of files, directories, tables, databases, and logical constructs.

3. The method of claim 1, wherein the metadata comprises classification metadata and properties metadata.

4. The method of claim 1, wherein the group membership comprises an identification of the plurality of users that are in groups.

5. The method of claim 1, wherein at least of the metadata, the entitlement data, the group membership data, the access permissions, and the audit logs are received in real-time or substantially in real-time.

6. The method of claim 1, wherein at least of the metadata, the entitlement data, the group membership data, the access permissions, and the audit logs are received periodically.

7. The method of claim 1, wherein the access permissions are received from access control lists.

8. The method of claim 7, wherein the access permissions are further received from file and directory permissions.

9. The method of claim 1, further comprising:

storing the joined data in an optimal format for querying.

10. A system for monitoring data usage in multi-tenancy enabled HADOOP clusters, comprising:

a data mart comprising at least one computer processor;

one or more multi-tenant enabled HADOOP clusters storing a dataset;

a metadata source storing metadata related to the dataset;

an entitlement data source storing entitlement data for a plurality of users;

a group membership source storing group membership data for the plurality of users;

an access permissions source storing access permissions for the plurality of users to the dataset; and an audit log source storing access history for the plurality of users to the dataset;

wherein:

the data mart receives batches of the metadata, the entitlement data, the group membership data, the access permissions, and the audit logs;

the data mart joins the batches of the metadata, entitlement data, group membership data, access permissions, and audit logs into a searchable database;

the data mart partitions the searchable database based on a unit of time;

the data mart receives a query comprising at least one of a date range, a file, a directory, a user, and a group of users;

the data mart applies the query to the searchable database; and the data mart returns results to the query.

11. The system of claim 10, wherein the dataset comprises at least one of files, directories, tables, databases, and logical constructs.

12. The system of claim 10, wherein the metadata comprises classification metadata and properties metadata.

13. The system of claim 10, wherein the group membership comprises an identification of the plurality of users that are in groups.

14. The system of claim 10, wherein at least of the metadata, the entitlement data, the group membership data, the access permissions, and the audit logs are received in real-time or substantially in real-time.

15. The system of claim 10, wherein at least of the metadata, the entitlement data, the group membership data, the access permissions, and the audit logs are received periodically.

16. The system of claim 10, wherein the access permissions source comprises at least one access control list.

17. The system of claim 16, wherein the access permissions comprise file and directory permissions.

18. The system of claim 10, wherein the data mart stores the joined data in an optimal format for querying.

\* \* \* \* \*